United States Patent
Feyereisen et al.

(10) Patent No.: US 7,286,062 B2
(45) Date of Patent: Oct. 23, 2007

(54) PERSPECTIVE VIEW CONFORMAL TRAFFIC TARGETS DISPLAY

(75) Inventors: Thea L. Feyereisen, Hudson, WI (US); Aaron J. Gannon, Anthem, AZ (US); Gang He, Morristown, NJ (US); David A. Shirley, Goodyear, AZ (US); Blake W. Wilson, Peoria, AZ (US)

(73) Assignee: Honeywell International, Inc., Morristown, NJ (US)

( * ) Notice: Subject to any disclaimer, the term of this patent is extended or adjusted under 35 U.S.C. 154(b) by 190 days.

(21) Appl. No.: 11/170,356

(22) Filed: Jun. 29, 2005

(65) Prior Publication Data

US 2007/0001874 A1    Jan. 4, 2007

(51) Int. Cl.
G08G 5/04    (2006.01)
(52) U.S. Cl. ........................ 340/961; 340/945; 701/301
(58) Field of Classification Search ................ 340/945, 340/961; 701/301
See application file for complete search history.

(56) References Cited

U.S. PATENT DOCUMENTS

| | | | |
|---|---|---|---|
| 5,179,377 A * | 1/1993 | Hancock | 340/961 |
| 5,227,786 A * | 7/1993 | Hancock | 340/961 |
| 5,313,201 A | 5/1994 | Ryan | |
| 6,085,150 A * | 7/2000 | Henry et al. | 701/301 |
| 6,275,172 B1 * | 8/2001 | Curtis et al. | 340/961 |
| 6,313,783 B1 * | 11/2001 | Kuntman et al. | 342/32 |
| 6,429,789 B1 * | 8/2002 | Kiridena et al. | 340/905 |
| 6,469,660 B1 * | 10/2002 | Horvath et al. | 342/179 |
| 6,678,588 B2 | 1/2004 | He | |
| 6,690,296 B2 | 2/2004 | Corwin et al. | |
| 6,690,299 B1 | 2/2004 | Suiter | |
| 6,700,482 B2 * | 3/2004 | Ververs et al. | 340/500 |
| 6,703,945 B2 | 3/2004 | Kuntman et al. | |
| 6,970,106 B2 * | 11/2005 | Vial | 340/961 |
| 7,030,780 B2 * | 4/2006 | Shiomi et al. | 340/961 |
| 7,132,961 B2 * | 11/2006 | Yannone et al. | 340/961 |
| 2003/0151630 A1 * | 8/2003 | Kellman et al. | 345/838 |

FOREIGN PATENT DOCUMENTS

EP    0 493 822 A1    7/1992
EP    1 474 789 B1    6/2005

* cited by examiner

*Primary Examiner*—Jeffery Hofsass
*Assistant Examiner*—Anne V. Lai
(74) *Attorney, Agent, or Firm*—Ingrassia Fisher Lorenz

(57) ABSTRACT

A system and method for displaying traffic targets in a conformal perspective view. The system comprises a display screen for graphical display of data, one or more sensors for obtaining traffic data regarding traffic targets, and one or more processors for receiving traffic data from the one or more sensors and providing input to the display screen. The display screen displays traffic targets as icons in a 3-dimensional graphical representation of real space. The display size of the icons is selected from a finite set of sizes which correspond to a finite set of distance ranges based on the distance to the traffic targets.

18 Claims, 7 Drawing Sheets

PERSPECTIVE VIEW CONFORMAL TRAFFIC TARGETS DISPLAY

TECHNICAL FIELD

The present invention generally relates to graphical displays and, in particular, to displays used in operating a craft.

BACKGROUND

In operating a craft, such as an aircraft, submarine or lunar lander, the operator needs to quickly ascertain what traffic targets are approaching and determine how best to avoid the targets. Current technology provides the operator with much of the information needed to complete this task. For example, real-time sensors can indicate on a display where traffic targets are located. The ability of these sensors to accurately detect relevant data, such as target location, speed, direction, etc., is continuously being improved. However, current displays are limiting the ability of the operator to quickly understand the data being delivered from the sensors.

Unfortunately, most current displays do not adequately represent the relative location of traffic targets shown on the display. This limits the operator's ability to make a quick determination of which targets pose the greatest threats to the craft. In certain situations, such as in an aircraft, the ability to quickly ascertain such information is crucial to successful navigation of the craft. For example, where more than one target is present, the operator will need to know which target is closest to his own craft in order to determine in which direction the craft should be maneuvered first.

For the reasons stated above, and for other reasons stated below which will become apparent to those skilled in the art upon reading and understanding the present specification, there is a need in the art for a display which will provide the operator with quick and easy access to depth and relational position data of traffic targets.

SUMMARY

The problem of providing a display which gives the operator of a craft quick and easy access to depth and relational position data of traffic targets is solved by the present invention of a perspective view conformal traffic targets display.

In one embodiment, a display system comprising a display screen for graphical display of data, one or more sensors for obtaining traffic data regarding traffic targets, and one or more processors for receiving traffic data from the one or more sensors and providing input to the display screen is provided. The display screen displays traffic targets as icons in a 3-dimensional graphical representation of real space. The display size of the icons is selected from a finite set of sizes which correspond to a finite set of distance ranges based on the distance to the traffic targets.

In another embodiment, a method for displaying conformal traffic in perspective view comprising checking real-time traffic sensor outputs, determining if detected traffic targets are within a field of view, selecting icon display size from a finite set of sizes which correspond to a finite set of distance ranges based on the distance to the traffic targets, and displaying the icons on a display screen is provided.

The present invention together with the above and other advantages may best be understood from the following detailed description of the embodiments of the invention illustrated in the drawings, wherein:

DRAWINGS

DETAILED DESCRIPTION

Figure 1:
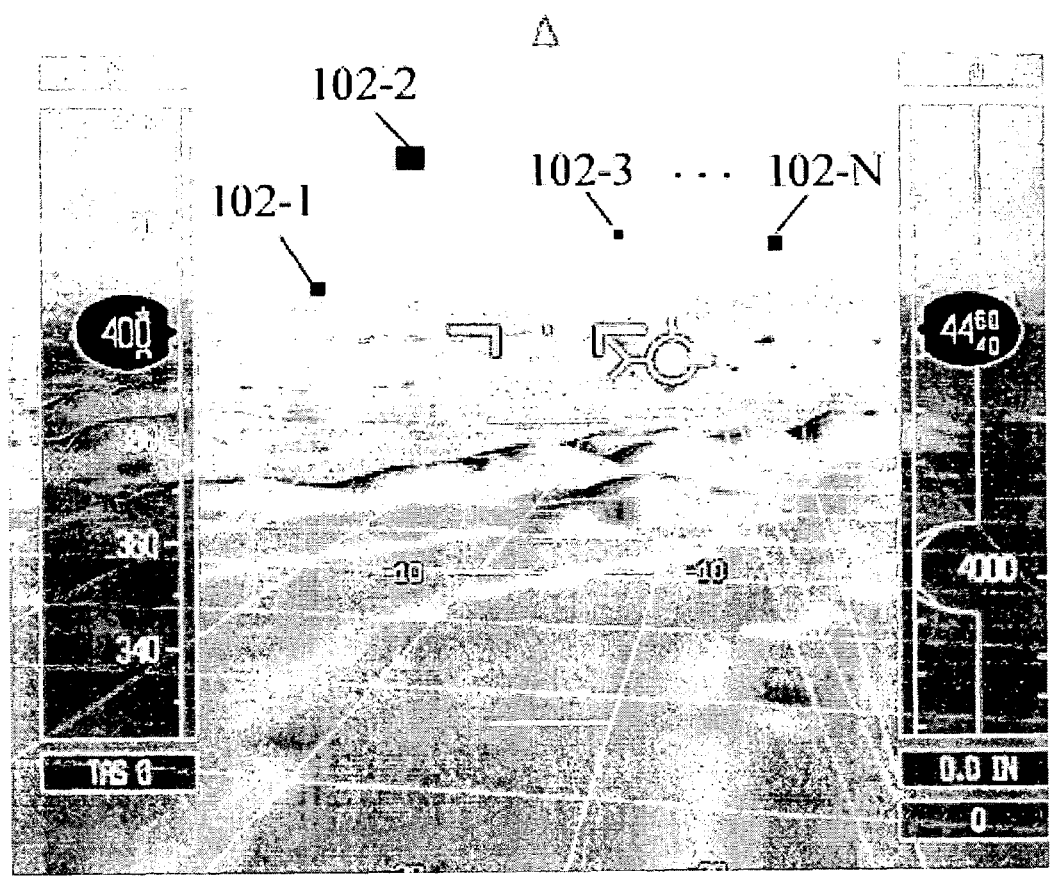
FIG. 1 is an image of a graphical display according to one embodiment of the present invention.

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. Furthermore, it will be understood by one of skill in the art that although the specific embodiments illustrated below are directed at aircraft for purposes of explanation, the method and apparatus may be used in various embodiments employing various types of crafts, such as submarines, space craft, lunar landers, and unmanned air vehicles (UAV), etc. The following detailed description is, therefore, not to be taken in a limiting sense.

Embodiments of the present invention may be described in terms of functional block diagrams and various processing steps. It should be appreciated that such functional blocks may be realized in many different forms of hardware, firmware, and or software components configured to perform the various functions. For example, embodiments of the present invention may employ various integrated circuit components, e.g., memory elements, digital signal processing elements, look-up tables, and the like, which may carry out a variety of functions under the control of one or more microprocessors or other control devices. Such general techniques are known to those skilled in the art and are not described in detail herein. Moreover, it should be understood that the exemplary process illustrated may include additional or fewer steps or may be performed in the context of a larger processing scheme. Furthermore, the various methods presented in the drawing figures or the specification are not to be construed as limiting the order in which the individual processing steps may be performed.

FIG. 1 is an image of a graphical display according to one embodiment of the present invention. The graphical display includes traffic targets 102-1 . . . 102-N. Traffic targets 102-1 . . . 102-N have different sizes indicating the relative distance to each target. As depicted in FIG. 1, target 102-2 is larger than targets 102-1 and 102-3, thus, indicating that target 102-2 is closer to the aircraft than targets 102-1 and 102-3. In one embodiment, this conformal view (i.e. closer objects appear larger than objects further away as in the real world) is achieved by using a finite set of layers of conformal size. Each layer is associated with a specific range of distances and a specific icon size. Each traffic target located within a particular range is displayed using the same icon size. In one embodiment, there are 3 layers each associated with 1 of 3 distance ranges. A first range is 5 miles and greater, a second range is 2-5 miles, and a third range is 2 miles and less. Each target located in one of these ranges utilizes the same base icon size. These ranges are provided by way of example and not by way of limitation. In other embodiments, other appropriate range distances and number of ranges are chosen based on the intended application.

In another embodiment, the conformal view is achieved by changing the icon size for each target as a continuous function of distance to the target. The icon sizes are bounded by a maximum and a minimum icon size. The maximum and minimum icon sizes improves the clear visualization of all the targets by preventing icons for closer targets from occupying too much of the display and icons for targets located further away from being too small on the display. In such an embodiment, there is typically one range of distances used for determining when targets will be displayed on the screen.

In some embodiments, if a target is not within the field of view, it is caged against the side of the display. In other embodiments, if a target is not within the field of view, it is not displayed. In yet other embodiments, a filter is used to limit the display to the most pertinent traffic (e.g. targets that do not pose a threat are not be displayed). Additionally, in some embodiments, the color of the icon is changed to correspond to standard caution or warning alerts such as alerts in Traffic alert and Collision Avoidance Systems (TCAS).

The layered conformal size provides several advantages over other current approaches to display traffic targets. First, unlike current displays which typically render all targets the same size, the present display enables the operator to gain a quick general awareness of the relational position of targets. Second, it prevents target icons from getting too big or too small. For example, if the layers were not used, the target icons would continue to get larger as the distance to the target decreases and smaller as the distance increases. This approach would be more conformal. However, due the size and speed of typical targets (e.g. other aircraft), a target may be a potential threat at far distances where the icon is very small in a more conformal view or may maneuver very close where the icon will be so large it occupies too much of the display. Therefore, the layers prevent an icon from getting too small or too big so that the operator can be aware of the relational position of targets without sacrificing awareness of targets far away or losing display area to targets that are very close. Lastly, this layered conformal view reduces the load placed on the processor in determining the icon size allowing the processor to work more efficiently on other tasks.

Figure 2:
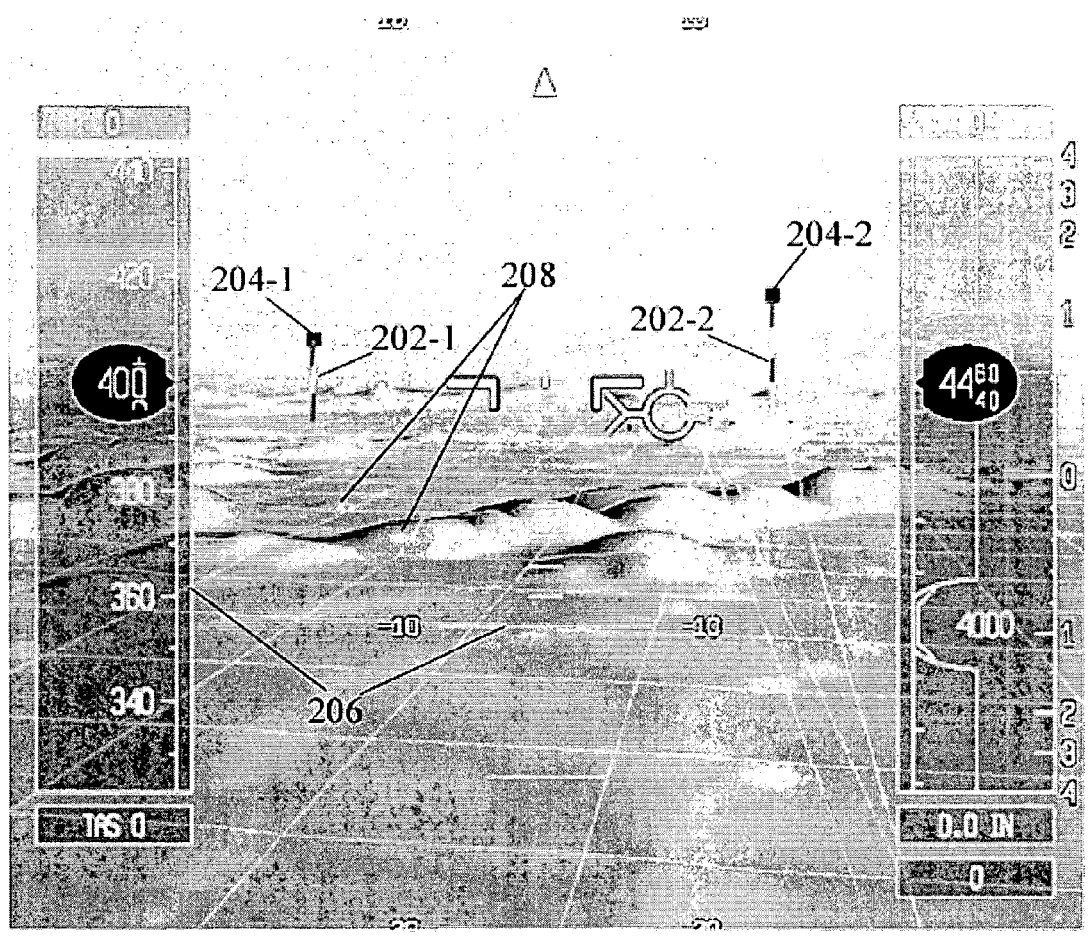
FIG. 2 is an image of a graphical display according to another embodiment of the present invention.

FIG. 2 is an image of a graphical display according to another embodiment of the present invention. The graphical display includes terrain 208, flight symbology 206, targets 204-1 and 204-2, and indexing lines 202-1 and 202-2. In some embodiments, terrain 104 includes mountains, ground, and rivers, etc. In other embodiments, terrain 104 includes geo-spatial boundaries, restricted airspace, etc. Although only two targets are displayed in FIG. 2, it will be understood by one of skill in the art that in other embodiments the display contains N number of targets and indexing lines. Indexing lines 202-1 and 202-2 run from targets 204-1 and 204-2, respectively, to terrain 208. The indexing lines in this embodiment further aid the operator in obtaining a quick perspective of the relational position of the targets. By connecting targets 204-1 and 204-2 to terrain 208, the operator has better depth perception with regards to the targets' location. Additionally, in one embodiment, the indexing line alternates colors to indicate units of altitude. As depicted in FIG. 2, target 204-1 is 3 units above terrain 208 and target 204-2 is 4 units above terrain 208. A unit may be any appropriate measure of altitude such as 1000 feet or 1000 meters, etc. Current displays do not typically include an indexing line for targets as in the present invention. Therefore, present invention provides an advantage over current displays by making it easier to gain depth perception regarding targets and easier to determine quickly the relative altitude of targets.

Figure 3:
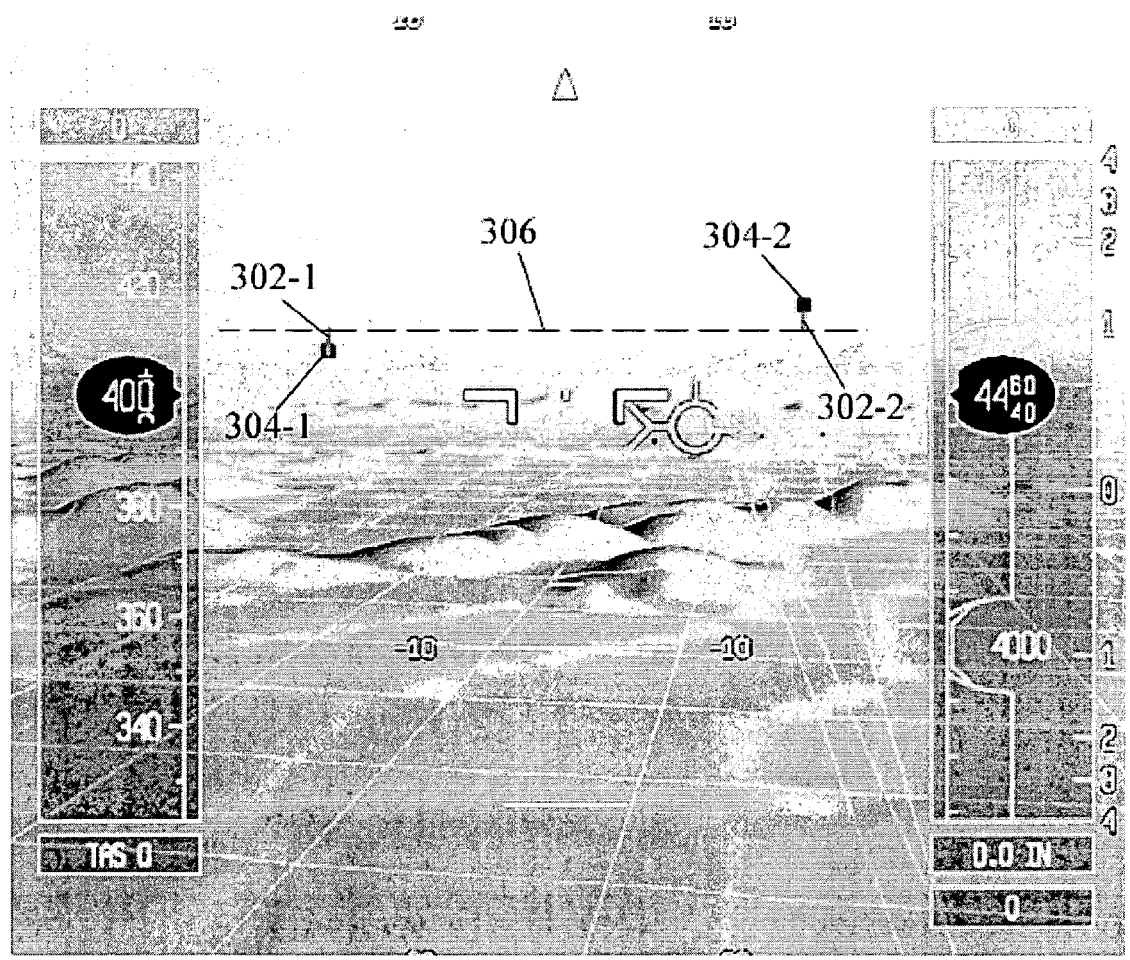
FIG. 3 is an image of a graphical display according to another embodiment of the present invention.

FIG. 3 is an image of a graphical display according to another embodiment of the present invention. The display in FIG. 3 also uses an indexing line as in FIG. 2. However, the indexing line in FIG. 3 is used to indicate different data regarding targets 304-1 and 304-2. Although only two targets are displayed in FIG. 3, it will be understood by one of skill in the art that in other embodiments the display contains N number of targets and indexing lines. In FIG. 3 indexing lines 302-1 and 302-2 run from targets 304-1 and 304-2, respectively, to a specified altitude 306. In some embodiments, altitude 306 is the altitude of the operator's aircraft. In other embodiments, altitude 306 is a different appropriate altitude. As depicted in FIG. 3, it is easy for the operator to see how far a particular target is above or below the specified altitude 306.

Figure 4:
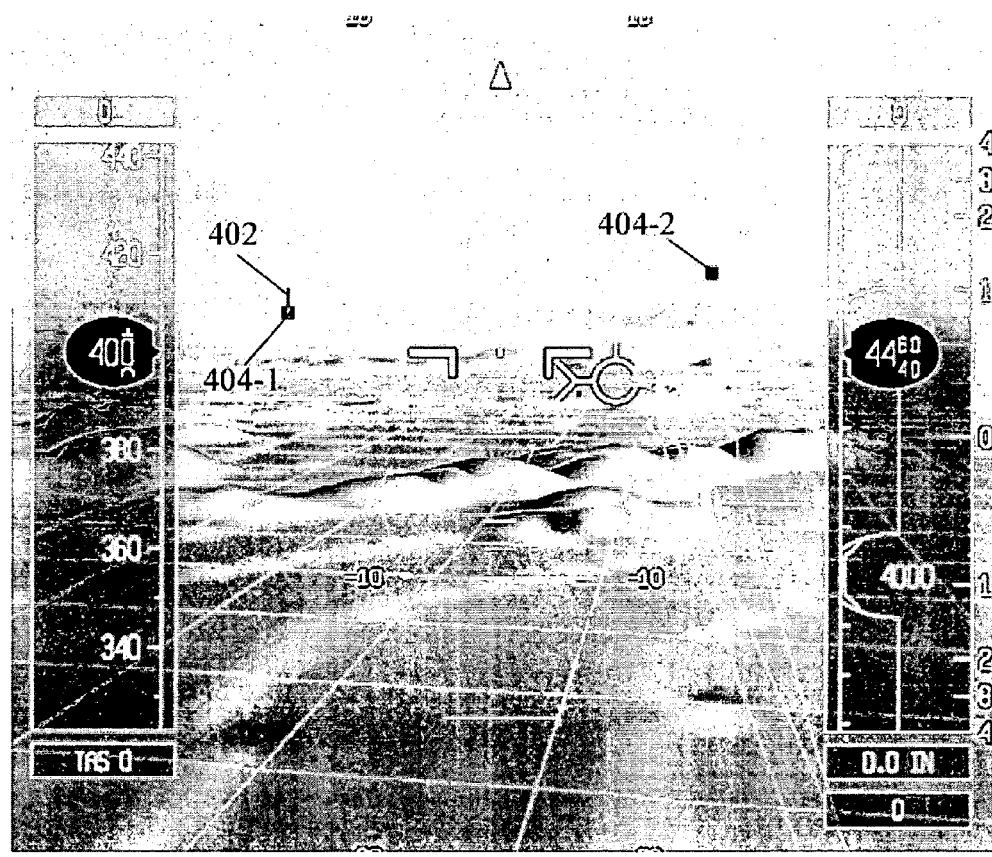
FIG. 4 is an image of a graphical display according to another embodiment of the present invention.

FIG. 4 is an image of a graphical display according to another embodiment of the present invention. The display in FIG. 4 also uses an indexing line as in FIGS. 2 and 3. However, the indexing line in FIG. 4 is used to indicate different data regarding targets 404-1 and 404-2. Although only two targets are displayed in FIG. 4, it will be understood by one of skill in the art that in other embodiments the display contains N number of targets and indexing lines. In FIG. 4, the indexing line is used to indicate the ascension or descension rate of targets 404-1 and 404-2. As depicted by indexing line 402 in FIG. 4, target 404-1 is ascending at one unit per time division. The unit and time division can be any appropriate values for the intended use of the display. For example, in one embodiment the values are 10 miles per hour. Target 404-2 is neither ascending or descending as indicated by the lack of an indexing line.

Figure 5:
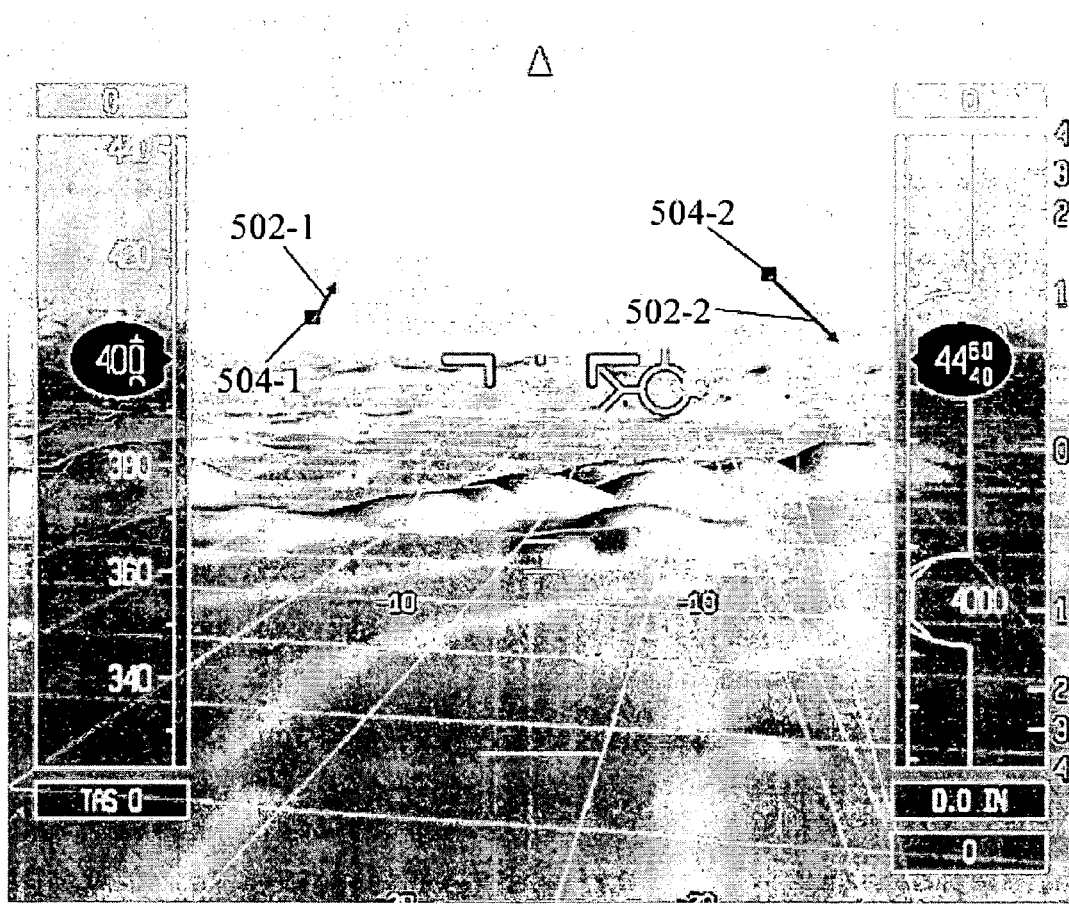
FIG. 5 is an image of a graphical display according to another embodiment of the present invention.

FIG. 5 is an image of a graphical display according to another embodiment of the present invention. The display in FIG. 5 also uses an indexing line as in FIGS. 2-4. However, the indexing line in FIG. 5 is used to indicate different data regarding targets 504-1 and 504-2. Although only two targets are displayed in FIG. 5, it will be understood by one of skill in the art that in other embodiments the display contains N number of targets and indexing lines. In FIG. 5, the indexing line is used with an arrowhead to indicate the targets speed and direction of travel. As indicated by indexing line 502-1, target 504-1 is traveling into the path of the operator's aircraft whereas, indexing line 502-2 indicates that target 504-2 is traveling away from the path of the operator's aircraft.

Each of the embodiments found in FIGS. 2-5 provides the operator with useful information by using indexing lines. In other embodiments, the indexing line is used to show the projected location of a target in a given number of seconds. In yet other embodiments, the indexing line is used to show the projected location of a target when the target's projected path intersects with the craft's current projected path. The use of indexing lines in each of the embodiments enables the operator to gather that information quickly and easily. In some embodiments, the operator can switch between the different types of indexing lines as described above. In other embodiments, additional indexing lines are used to depict other important information for use by the operator. In yet other embodiments, multiple indexing lines are used for a single target to indicate different data regarding the target. In some embodiments, one or more indexing lines are used for each target displayed. In other embodiments, one or more indexing lines are only used for targets associated with a caution or warning alert. Additionally, in some embodiments, the color of the indexing lines will match the color of its associated icon.

Figure 6:
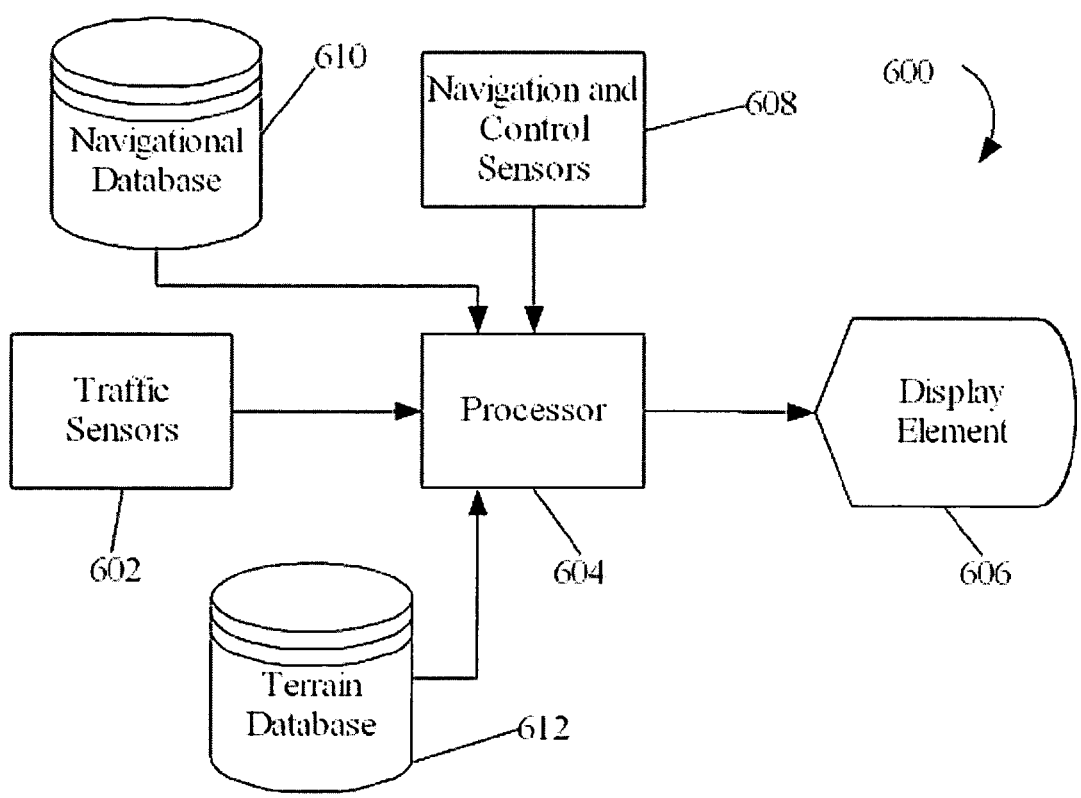
FIG. 6 is a block diagram of a graphical display system according to one embodiment of the present invention.

FIG. 6 is block diagram of a graphical display system according to one embodiment of the present invention. In FIG. 6, an exemplary graphical display system 600 includes processor 604 configured to provide information to display element or monitor 606. One or more data sources are coupled to processor 604. These data sources include, but are not limited to, navigation and control sensors 608, navigational database 610, terrain database 612 and traffic sensors 602. In some embodiments, one or more of these data sources are omitted. The databases and sensors are typically located onboard the craft but it is not required that they be so located. For example, in some embodiments, the databases are located in a central flight tower or mission control center and the sensors are located on a surveillance craft or in a surveillance tower which relays traffic data to the craft. Additionally, each of these databases is instantiated as one or more databases. Data in these databases is stored on any type of suitable medium such as floppy disks, conventional hard disks, CD-ROM, flash ROM, nonvolatile ROM, RAM, or other suitable medium.

Processor 604 includes or interfaces with hardware components that support the graphics display system. By way of example and not by way of limitation, these hardware components include one or more microprocessors, memories, storage devices, interface cards, and other standard components known in the art. Additionally, processor 604 includes or functions with software programs, firmware or computer readable instructions for carrying out various methods, process tasks, calculations, control functions, and the generation of display signals and other data used in the operation of the display system. These instructions are typically stored on any appropriate medium used for storage of computer readable instructions such as floppy disks, conventional hard disks, CD-ROM, flash ROM, nonvolatile ROM, RAM, and other like medium.

Display element 606 includes any display element suitable for displaying the various symbols and information for the operation of embodiments of the present invention. There are many known monitors that are suitable for this task, such as various CRT and flat-panel display systems. Display element 606 is instantiated on a panel mounted display, a heads-up display (HUD) projection, flexible Organic LED (OLED) or any other existing or later developed display technology.

Processor 604 generates data for display on display element 606 based on positional and traffic data. In some embodiments, processor 604 is configured to receive and process navigation and positional data (e.g. position, speed, direction) regarding current aircraft location from navigation and control sensors 608. In other embodiments, processor 604 is configured to receive navigation and positional data from navigational database 610. Navigational database 610 is configured to store data concerning one or more flight paths. In one embodiment utilizing navigational database 610, positional data is used to search for and display traffic for different locations along one or more flight paths helping an operator choose the safest path to follow. In yet other embodiments, processor 604 is configured to receive data from navigation and control sensors 608 and from navigational database 610.

Based on the positional data, processor 604 obtains terrain data from terrain database 612 and traffic data from traffic sensors 602. In one embodiment, terrain database contains data regarding the terrain and processor 604 sends a signal to display element 606 to render a simulated graphical representation of the terrain based on that data. In another embodiment, the terrain database contains actual images of the terrain and processor 604 sends a signal to display element 606 to display the actual image based on the positional data.

Traffic sensors 602 include any number of receivers, infrared lasers, millimeter wave cameras or other sensor elements for obtaining traffic data regarding traffic targets. In some embodiments, traffic data includes data about a target's location, speed, size, and trajectory. In other embodiments, traffic data also includes data about a target's aircraft type, flightplan, airline, class, and avionic equipage. Various known equipment is suitable for obtaining some or all of this data including Automatic Dependent Surveillance Broadcast (ADS-B) equipment and Traffic alert and Collision Avoidance Systems (TCAS).

Processor 604 analyzes the data received from traffic sensors 602 and determines if the traffic targets are located within the field of view. In some embodiments, traffic targets that are not within the field of view are not displayed. In other embodiments, targets that are not within the field of view are caged to the side of display element 606.

Processor 604 also calculates the display icon size of targets. Based on the distance to each target, processor 604 assigns each target to one of a finite set of distance ranges. Each finite distance range is associated with one icon size. Each displayed target within a particular distance range will be displayed with the same size icon. This layered conformal view provides several advantages as discussed above with respect to FIG. 1.

In some embodiments, processor 604 analyzes the traffic data to determine the threat posed by each target. In some embodiments, processor 604 only sends a signal to display element 606 to display targets associated with a caution or warning. In other embodiments, processor 604 sends a signal to display element 606 to highlight and change the shape and color of displayed traffic targets to reflect the target threat. The threat is determined based on the target's size, proximity to the aircraft and trajectory. In some embodiments, the highlighting, shape and color change correspond to audio warnings and alerts such as TCAS alerts. Additionally, in some embodiments, processor 604 calculates indexing lines for targets based on data received from traffic sensors 602 and sends a signal to display element 606 to render indexing lines as discussed above with respect to FIGS. 2-5.

In one embodiment, the display view is an egocentric view (i.e. a view from current aircraft location). In another embodiment, the display view is an exocentric view (i.e. a view from a location other than current aircraft location). In yet another embodiment, a user can select between an egocentric and an exocentric view of the 3-dimensional graphical representation of real space.

Figure 7:
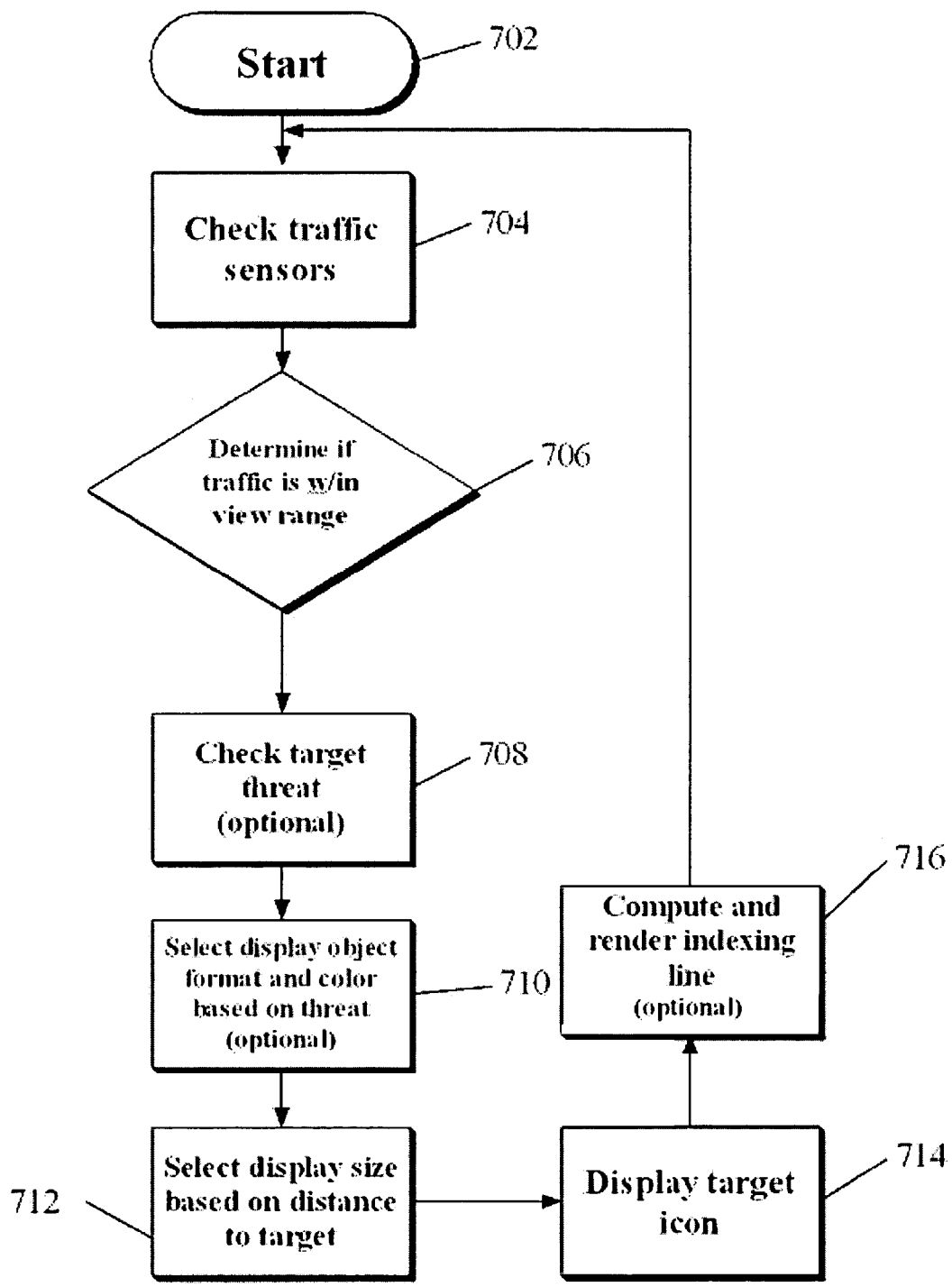
FIG. 7 is a flow chart showing a method of displaying traffic targets in a conformal perspective view according to one embodiment of the present invention.

FIG. 7 is a flow chart showing a method of displaying traffic targets in a conformal perspective view according to one embodiment of the present invention. At 704, traffic sensors are checked for traffic targets around a specified position or location. In one embodiment, these sensors pass data to one or more processors for immediate use. In another embodiment, these sensors pass data to a memory for recall and use by the one or more processors at a later time. If no targets are located, the process will continue at 704 until targets are located.

At 706, it is determined if the traffic targets are located within the field of view of the display. In some embodiments, if located traffic targets are not within the field of view, those targets will not be displayed. In other embodiments, those targets not located within the field of view will be caged against the side of the display.

At 708, the threat posed by each target is checked. In some embodiments, targets which are not associated with a caution or warning are not displayed. Additionally, in some embodiments, the icon color and object format is selected at 710 based on the target threat. In other embodiments, the icon selected for each target is representative of the target's type of craft.

At 712, the icon display size for displayed targets is selected based on the distance to the target. In one embodiment, this selection is based on assigning each target to one of a finite set of distance ranges with an associated icon size as described above with respect to FIG. 1. In another embodiment, this selection is based on a continuous function of distance to the target as described above with respect to FIG. 1.

At 714, the targets are displayed based on the size, object format, color and threat determinations made previously. At 716, in some embodiments indexing lines are computed and displayed for the displayed targets as described above with respect to FIGS. 2-5. The process then repeats at 704. In a preferred embodiment, the repeat rate is 20 times per second. In other embodiments, a slower repeat rate is used with predicative positioning, a technique known to one of skill in the art.

Although specific embodiments have been illustrated and described herein, it will be appreciated by those of ordinary skill in the art that any arrangement, which is calculated to achieve the same purpose, may be substituted for the specific embodiment shown. For example, although the specific embodiments illustrated are directed at aircraft, the method and apparatus may be used in various embodiments employing various types of crafts, such as submarines, space craft, lunar landers, and UAVs, etc. This application is intended to cover any adaptations or variations of the present invention. Therefore, it is manifestly intended that this invention be limited only by the claims and the equivalents thereof.

What is claimed is:

1. A display system comprising:
a display screen for graphical display of data,
one or more sensors for obtaining traffic data regarding traffic targets, one or more processors for receiving traffic data from the one or more sensors, and for providing input to the display screen, and
the display screen displaying traffic targets as icons in a 3-dimensional graphical representation of real space, wherein the display size of the icons is selected from a finite set of sizes which correspond to a finite set of distance ranges based on the distance to the traffic targets, the set of distance ranges comprises one range, and the set of sizes comprises continuous size variations corresponding to distances within the one range, the size variations being bounded by a maximum and a minimum icon size.

2. The display system of claim 1 wherein, the one or more processors filters traffic data such that data is not provided to the display screen concerning traffic targets which do not pose a threat.

3. The display system of claim 1 wherein, the one or more processors are adapted to receive a user input to select between an egocentric and an exocentric view of the 3-dimensional graphical representation of real space.

4. The display system of claim 1 wherein, the display screen renders an indexing line for each selected traffic target, wherein the indexing line being perpendicular to its associated traffic target's plane of altitude and running from the plane of altitude to a specified altitude.

5. The display system of claim 1 wherein, the display screen renders an indexing line for each selected traffic target, wherein the indexing line being perpendicular to its associated traffic target's plane of altitude and running from the plane of altitude to terrain below the traffic target.

6. The display system of claim 1 wherein, the display screen renders an indexing line for each selected traffic target, wherein the indexing line indicates the speed and trajectory of its associated traffic target.

7. The display system of claim 1 wherein, the display screen renders an indexing line for each selected traffic target, wherein the indexing line indicates the ascension and descension rates of its associated traffic target.

8. The display system of claim 1 wherein, the display system is a flight deck display system on board an aircraft.

9. The display system of claim 8 wherein, the flight deck display system is a Heads-Up Display (HUD).

10. The display system of claim 8 wherein, the icons' color and object format is based on standard Traffic Alert and Collision Avoidance System (TCAS) display icons.

11. A method for displaying conformal traffic in perspective view, the method comprising:
checking real-time traffic sensor outputs,
determining if detected traffic targets are within a field of view,
selecting icon display size from a finite set of sizes which correspond to a finite set of distance ranges based on the distance to the traffic targets,
displaying the icons on a display screen,
rendering an indexing line for each traffic target running perpendicular from the traffic target's plane of altitude to terrain below the icon, each indexing line rendered in alternate colors to indicate units of altitude.

12. The method of claim 11 further comprising:
checking the threat posed by each detected traffic target,
selecting traffic target icon color and object format based on the threat posed by each traffic target.

13. The method of claim 12 further comprising:
filtering traffic data to remove traffic that is not a travel path threat.

14. A computer readable medium having computer-executable instructions for performing a method comprising:
receiving traffic data from traffic sensors,
determining the distance to the traffic targets identified by the traffic sensors, selecting a display size for each traffic target from a finite set of sizes which correspond with a finite set of distance ranges, based on the distance to each traffic target, sending instructions to a display to display an icon for each traffic target, calculating an altitude for each traffic target based on traffic data, and sending instructions to the display to render an indexing line from each traffic target to terrain below each object, each indexing line rendered in alternate colors to indicate units of altitude.

15. A display system comprising:

a display screen for graphical display of data, one or more sensors for obtaining traffic data regarding traffic targets, one or more processors for receiving traffic data from the one or more sensors, and for providing input to the display screen, and the display screen displaying traffic targets as icons in a 3-dimensional graphical representation of real space, and rendering an indexing line for each traffic target, wherein:

the display size of the icons is selected from a finite set of sizes which correspond to a finite set of distance ranges based on the distance to the traffic targets, and each indexing line is perpendicular to its associated traffic target's plane of altitude and runs from the plane of altitude to terrain below the traffic target and is rendered in alternate colors to indicate units of altitude.

16. A display system comprising:

a display screen for graphical display of data, one or more sensors for obtaining traffic data regarding traffic targets, one or more processors for receiving traffic data from the one or more sensors, and for providing input to the display screen, and the display screen displaying traffic targets as icons in a 3-dimensional graphical representation of real space, and rendering an indexing line for each traffic target, wherein:

the display size of the icons is selected from a finite set of sizes which correspond to a finite set of distance ranges based on the distance to the traffic targets, and the indexing line indicates ascension and descension rates of its associated traffic target.

17. A method for displaying conformal traffic in perspective view, the method comprising:

checking real-time traffic sensor outputs, determining if detected traffic targets are within a field of view, selecting icon display size from a finite set of sizes which correspond to a finite set of distance ranges based on the distance to the traffic targets, displaying the icons on a display screen, and rendering an indexing line for each traffic target indicating the ascension and descension rates of its associated traffic target.

18. A computer readable medium having computer-executable instructions for performing a method comprising:

receiving traffic data from traffic sensors, determining the distance to the traffic targets identified by the traffic sensors, selecting a display size for each traffic target from a finite set of sizes which correspond with a finite set of distance ranges, based on the distance to each traffic target, sending instructions to a display to display an icon for each traffic target, calculating a rate of ascension or descension for each traffic target based on traffic data, and sending instructions to the display to render an indexing line from each traffic target to indicate the rate of ascension or descension.

\* \* \* \* \*